United States Patent
Karpanty (10) Patent No.: US 11,363,808 B2
(45) Date of Patent: Jun. 21, 2022

(54) FISHING ROD HOLDER WITH PROTECTIVE COVER

(71) Applicant: Rupp Marine, Inc., Port Salerno, FL (US)

(72) Inventor: Ronald Karpanty, Port Salerno, FL (US)

(73) Assignee: Rupp Marine, Inc., Port Salerno, FL (US)

( * ) Notice: Subject to any disclaimer, the term of this patent is extended or adjusted under 35 U.S.C. 154(b) by 142 days.

(21) Appl. No.: 16/826,974

(22) Filed: Mar. 23, 2020

(65) Prior Publication Data

US 2020/0305403 A1    Oct. 1, 2020

Related U.S. Application Data

(60) Provisional application No. 62/823,354, filed on Mar. 25, 2019.

(51) Int. Cl.
A01K 97/10    (2006.01)

(52) U.S. Cl.
CPC ..................................... *A01K 97/10* (2013.01)

(58) Field of Classification Search
CPC ......... A01K 97/10; A01K 97/08; A01K 97/22
See application file for complete search history.

(56) References Cited

U.S. PATENT DOCUMENTS

| | | | | |
|---|---|---|---|---|
| 1,448,808 A | * | 3/1923 | McGowan | A47G 7/06 |
| | | | | 119/786 |
| 3,830,006 A | * | 8/1974 | Garbolino | A01K 97/08 |
| | | | | 43/25 |
| 4,375,731 A | * | 3/1983 | Budd | A01K 97/10 |
| | | | | 43/21.2 |
| 5,056,746 A | * | 10/1991 | Parsons | A47B 13/021 |
| | | | | 403/328 |
| 5,065,540 A | * | 11/1991 | Potter, Jr. | A01K 97/10 |
| | | | | 248/314 |
| 5,163,244 A | * | 11/1992 | Rupp | A01K 97/11 |
| | | | | 248/514 |
| 5,752,601 A | * | 5/1998 | Arthur | A01K 97/08 |
| | | | | 206/326 |
| 6,993,865 B2 | * | 2/2006 | Peters | A01K 97/10 |
| | | | | 248/514 |
| 7,007,906 B2 | * | 3/2006 | Slatter | A01K 91/08 |
| | | | | 43/21.2 |
| D591,386 S | * | 4/2009 | Baltes | D22/148 |
| 8,291,636 B2 | * | 10/2012 | Wilcox | A01K 97/10 |
| | | | | 114/364 |
| 8,640,377 B2 | * | 2/2014 | Baltes | A01K 97/10 |
| | | | | 224/406 |

(Continued)

FOREIGN PATENT DOCUMENTS

WO    WO2012160351    11/2012

*Primary Examiner* — Timothy D Collins
*Assistant Examiner* — Nicholas Leo Seneczko
(74) *Attorney, Agent, or Firm* — McHale & Slavin, P.A.

(57) ABSTRACT

A fishing rod holder formed from a rod holder base securable to a vessel having a protective cover that attaches to the rod holder base. The protective cover shields the rod holder base fasteners from direct exposure to the elements. The protective cover can be replaced without disturbing the rod holder base attachment. The protective cover conceals the rod holder base and mounting bracket, providing an aesthetically pleasing appearance.

9 Claims, 7 Drawing Sheets

(56) References Cited

U.S. PATENT DOCUMENTS

| | | | | |
|---|---|---|---|---|
| 8,881,668 B2* | 11/2014 | Bragman | ............... | A01K 97/10 |
| | | | | 114/364 |
| 8,944,399 B2* | 2/2015 | Sutherland | ............. | A01K 97/10 |
| | | | | 248/222.13 |
| 9,531,177 B1* | 12/2016 | Gretz | ..................... | H01R 24/76 |
| 10,709,125 B2* | 7/2020 | Sarnowski | ............. | B63B 17/00 |
| 2006/0086877 A1* | 4/2006 | Cotton | ................... | A01K 97/10 |
| | | | | 248/311.2 |
| 2008/0250692 A1 | 10/2008 | Wilcox et al. | | |
| 2010/0050495 A1* | 3/2010 | Brooks | ................ | A01K 87/007 |
| | | | | 43/4.5 |
| 2013/0008074 A1* | 1/2013 | Browne | ................ | A01K 97/10 |
| | | | | 43/21.2 |
| 2014/0367136 A1* | 12/2014 | Trojanowski | ............ | H02G 3/14 |
| | | | | 174/66 |
| 2015/0000177 A1* | 1/2015 | Liney | ..................... | A01K 97/10 |
| | | | | 43/21.2 |
| 2016/0037762 A1* | 2/2016 | Thomas | ................ | A01K 97/10 |
| | | | | 248/515 |
| 2016/0255823 A1* | 9/2016 | Thomas | ................ | A01K 97/10 |
| 2016/0377243 A1* | 12/2016 | Mercer | ..................... | F21L 4/02 |
| | | | | 362/183 |
| 2017/0150703 A1* | 6/2017 | Fenton | .................... | A01K 85/16 |
| 2018/0177174 A1* | 6/2018 | McQuade | ............... | F16C 11/10 |
| 2018/0371784 A1* | 12/2018 | Gonzalez | ............ | E04H 12/2246 |
| 2019/0059318 A1* | 2/2019 | Hanson | .................... | E02D 5/80 |

\* cited by examiner

FISHING ROD HOLDER WITH PROTECTIVE COVER

PRIORITY APPLICATION

In accordance with 37 C.F.R. § 1.76 a claim of priority is included in an Application Data Sheet filed concurrently herewith. Accordingly, the present invention claims priority to U.S. Provisional Patent Application No. 62/823,354 entitled "FISHING ROD HOLDER WITH PROTECTIVE COVER" filed Mar. 25, 2019. The contents of the above referenced application is incorporated herein by reference.

FIELD OF THE INVENTION

The present invention relates to the field of fishing and, more particularly, to a protective cover for fishing rod holders.

BACKGROUND OF THE INVENTION

Fishing is a popular activity enjoyed throughout the world by both professional and recreational fisherman. Boats used for fishing have the unique ability to be positioned proximate to the fishing grounds. For this reason, boats have been adapted over the years to facilitate the fishing mission. Modern fishing boats, used interchangeably with the term "vessel", can be classified as flats, center consoles, open fish, sportfish, convertible and so forth.

Fishing rod holders are well known attachments to a vessel for holding the fishing poles, or "rods", used in fishing. A problem, which this invention addresses, is that the fishing rod holders are attached to the gunwale of a vessel which can be easily damaged. For instance, a gunwale may be gelcoated, which is a hard surface layer of polyester resin which can easily chip. Alternatively, a vessel may be painted with a polyurethane paint, and like any painted surface it is easily scratched. Sportfishing vessels commonly use teak over the gunwale to protect the fiberglass surface coating, but wood can also be damaged. To help protect the surfaces, and provide adequate support for a fishing rod, manufacturers use large mounting brackets which help protect the surrounding surface of the rod holder.

To facilitate the fishing experience, a vessel may include numerous rod holders. While a sportfishing vessel may limit rod holders to the cockpit of the vessel, an open fisherman may include rod holders around the entire edge of the vessel. On larger open fishing boats, 20 or more rod holders are commonly employed. With so many rod holders exposed, the rod holders are no longer considered a minor accessory of a vessel. Rather, the rod holders have become part of the aesthetic design of a vessel. For this reason, the mounting flanges that support a cylindrical tube sized to receive the butt of a fishing rod must be aesthetically pleasing when they consume a large amount of gunwale surface area. It is noted that fishing boats are not regulated to hard core fisherman; such boats have a family appeal and may be used for entertainment.

Rod holder designers have recognized that the mounting bracket of the rod holder needs to be large enough to protect the surrounding gunwale, and of a high quality to provide a long lasting structure. Mounting bracket variations include the use of high quality metals having a polished surface. However, the rod holders need to be secured to the gunwale, and the conventional manner is by the use of screw fasteners. The screw fasteners are positioned in mounting brackets, typically by three mounting holes that are constructed and arranged to receive the screw fasteners.

A problem with the screw fasteners used with rod holders is that the fasteners are directly exposed to the environment. Rain, salt spray, washing of the vessel, sunlight and so forth constitute exposure of the screws fasteners to environmental conditions that can distract from the original appearance. For instance, if water penetration around the screw fasteners occurs, then a rod holder can become loose, wherein a larger screw may be required to secure the rod holder. Marring of the screw fasteners during installation and removal can also distract from the appearance. Boat grime that gathers around the screw can be treated with chemicals, but the use of chemicals is likely to cause the underlying fiberglass to delaminate.

One known attempt to conceal fasteners from direct exposure is to attach the rod holder with fasteners located beneath the gunwale. While placing fasteners beneath the gunwale protects the fasteners from direct exposure, installation/service may only be possible during vessel construction. Replacement of concealed fasteners may not be possible after vessel construction, or be very difficult and thus not serviceable. Should the hidden fastener become loose, again it may be impossible to tighten. Should additional rod holders be requested, it may not be possible to reach the fasteners hidden beneath the gunwale.

What is lacking in the art is a rod holder capable of being mounting from the upper surface of the gunwale that provides the advantages of hidden screws and protects the screw fasteners from direct exposure to the environment.

SUMMARY OF THE INVENTION

Disclosed is a rod holder base having a protective cover for use in holding fishing rods. The rod holder base is formed from a mounting flange having three mounting holes extending therethrough; the mounting holes each receive a screw fastener for securing the mounting flange to the gunwale of a vessel. The rod holder base includes a centrally disposed aperture having a cylindrical tube depending therefrom to receive the butt of a fishing rod. The mounting flange is constructed and arranged to receive the protective cover which operates as a shield for the mounting flange and associated screw fasteners. The protective cover is preferably constructed from a high quality polished stainless steel; the mounting flange and cylindrical tube can be constructed from an unpolished, corrosion resistant material. When the protective cover is installed over the mounting flange, the screw fasteners are shielded from direct exposure to the elements.

An objective of the invention is to provide a protective cover that attaches to a rod holder base to shield the fastener screws from direct exposure to the environment.

Another objective of the invention is to provide an aesthetically pleasing rod holder by concealing of the screw fasteners.

Yet another objective of the invention is to teach the use of a rod holder having a base with a first finish concealed by a protective cover having a second finish.

Another objective of the invention is to teach the use of a rod holder having a base constructed of a first material concealed by a protective cover constructed of a second material.

Still another objective of the invention is provide a rod holder wherein the mounting flange is embedded in the vessel hull by epoxy, or 3M 5200, with a removably attached protective shield.

Yet still another objective of the invention is to lower the cost of a rod holder by use of an unfinished base, yet provide a higher quality appearance by use of a finished protective cover.

Another objective of the invention is to provide a rotatable plug allowing a fishing rod to be placed in a different configuration.

Still another objective of the invention is to provide rotatable rod holder. An advantage of a rotatable rod holder is that boat builders/customer do not always know where they want a rotating rod holder. By using or removing a lock washer, a rod holder can be converted between a fixed rod holder or a rotating rod holder.

Other objectives and advantages of this invention will become apparent from the following description, taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DESCRIPTION OF THE PREFERRED EMBODIMENT OF THE INVENTION

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
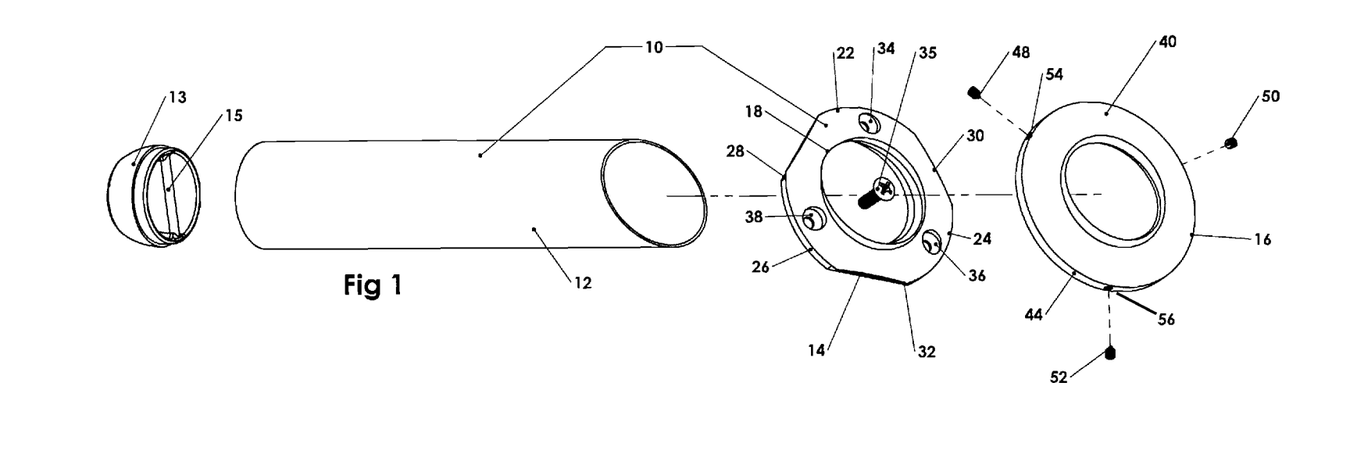
FIG. 1 is an exploded assembly view of a fishing rod holder with mounting bracket and protective cover in accordance with the preferred embodiment of the instant invention.
Figure 2:
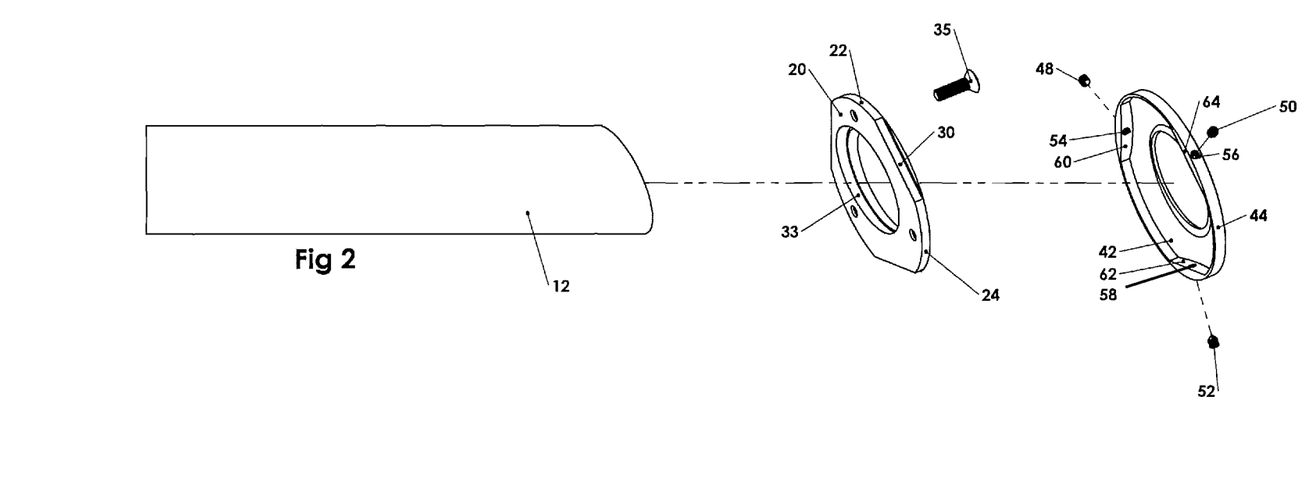
FIG. 2 is an alternate exploded view of FIG. 1.

Referring to the Figures in general, disclosed is a fishing rod holder assembly 10 for mounting on the gunwale or other section of a marine vessel. FIGS. 1 and 2 illustrate a preferred embodiment of the invention. A rod holder assembly 10, consisting of a circular cylindrical rod holder section 12 constructed of metal having a shaped mounting bracket 14, and a protective cover 16. The end of the cylindrical rod holder 12 includes an end plug 13 which is typically welded to the rod holder 12 and include a cross piece 15 sized to receive a forked end on a conventional fishing rod.

The mounting bracket 14 is defined by an upper surface 18, a lower surface 20, rounded outer side surfaces 22, 24 and 26, flat outer side surfaces 28, 30 and 32 and inner side surface 33.

The mounting bracket 14 is attached to the rod holder section 12 by weldment. Once attached, the rod holder assembly 10 is mounted to the gunwale or other section of a boat hull by inserting a threaded fastener screw 35 into screw receptacles 34, 36 and 38. The threaded screws are preferably made of stainless steel, but other means of fastening may be used as further described herein. The protective cover 16, having an upper surface 40, a lower surface 42, a circular outer side surface 44, an inner side surface 46 having flat sections 60, 62 and 64, each flat section having a threaded inset screw receptacle 54, 56 and 58. The protective cover 16 is placed over the mounting bracket 14, aligning the lower surface inner flat section with the flat side surfaces 28, 30 and 32 of the mounting bracket 14, and is attached by means of inserting threaded inset screws 48, 50 and 52 into threaded screw receptacles 54, 56 and 58 of the protective cover 16. When attached, the protective cover 16 provides an aesthetically pleasing appearance over the mounting bracket 14 and exposed screws.

Figure 3:
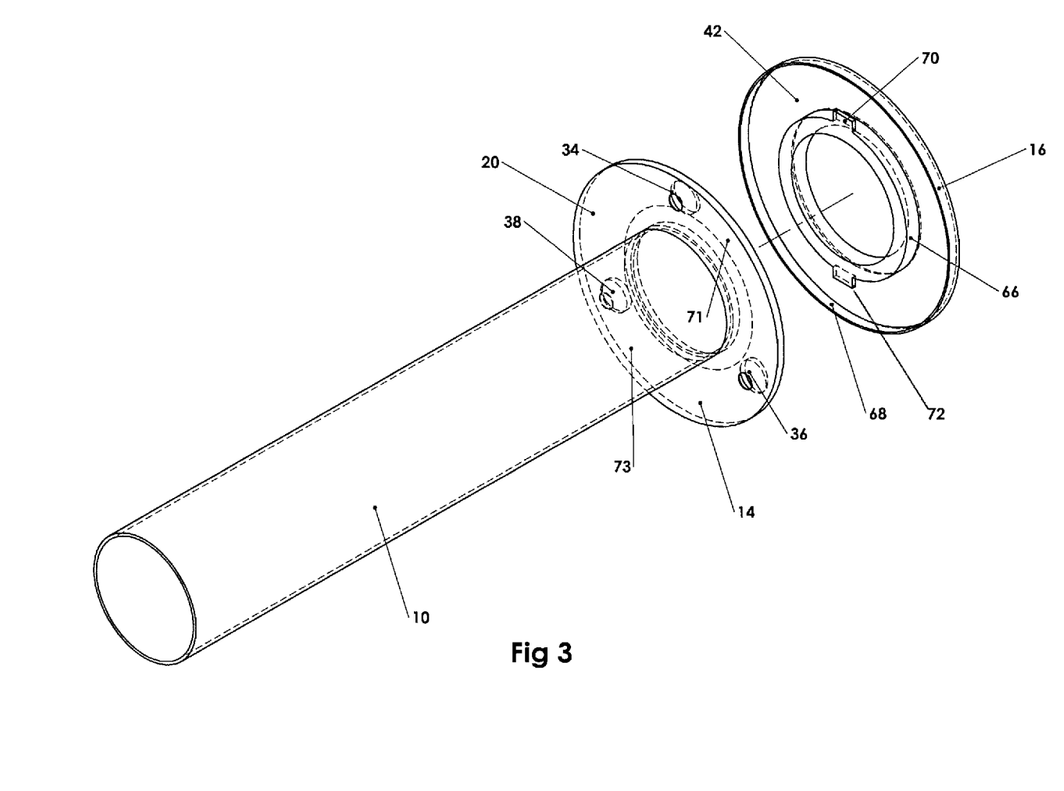
FIG. 3 is an alternate exploded view of a fishing rod holder with a mounting bracket and a protective cover having tabs.

FIG. 3 is an alternative embodiment of the instant invention, wherein the mounting bracket has a lock tab receptacles 71, 73 along an inner surface for engaging the protective cover 16 having a lower inner ring 66 with a lower surface 68. Lock tabs 70 and 72 constructed and arranged for insertion into the lock tab receptacles 71, 73. When the lock tabs 70 and 72 of the protective cover 16 are inserted into the lock tab receptacles of the mounting bracket 14, the protective cover is rotated 90° to lock the protective cover 16 in place over the mounting bracket 14.

Figure 4:
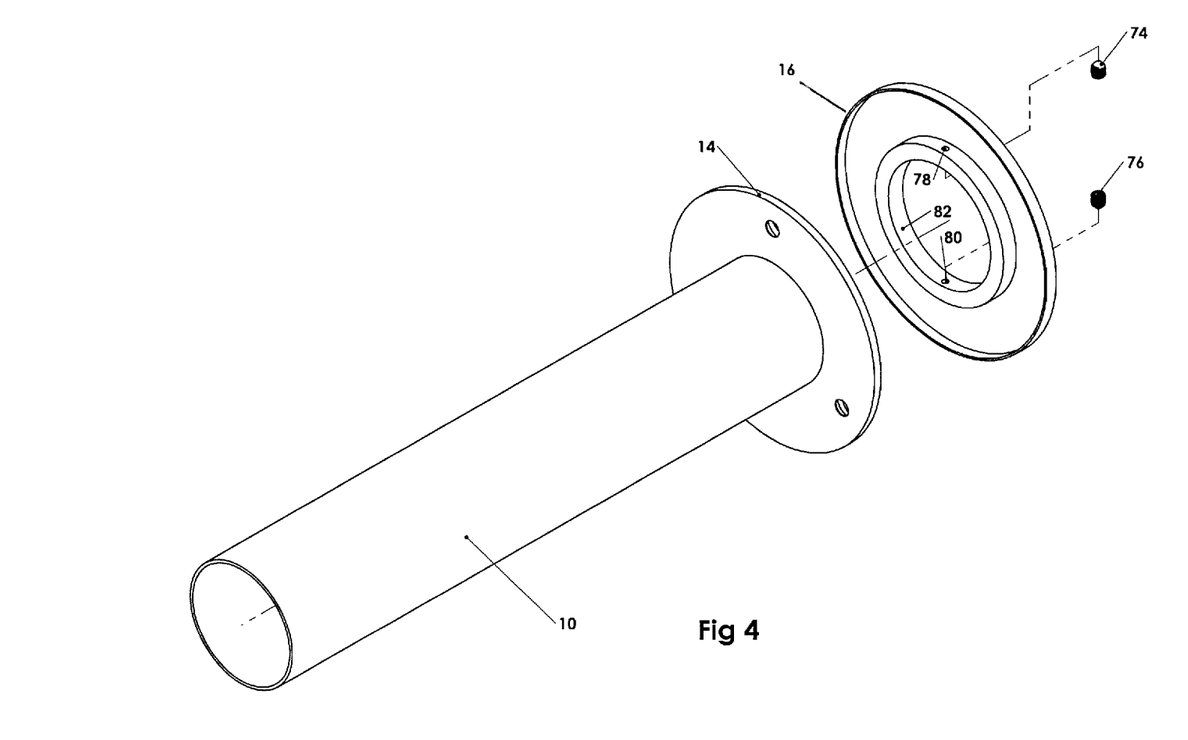
FIG. 4 is an alternate exploded view of a fishing rod holder with mounting bracket and a protective cover with an inner surface inset screw.

Referring to FIG. 4, an embodiment of the instant invention having diametrically opposed threaded inset screws 74 and 76 which are inserted into diametrically opposed threaded screw receptacles 78 and 80 located on the inner circular surface 82 of the protective cover 16 for attachment of the protective cover 16 to the mounting bracket 14 is illustrated.

Figure 5:
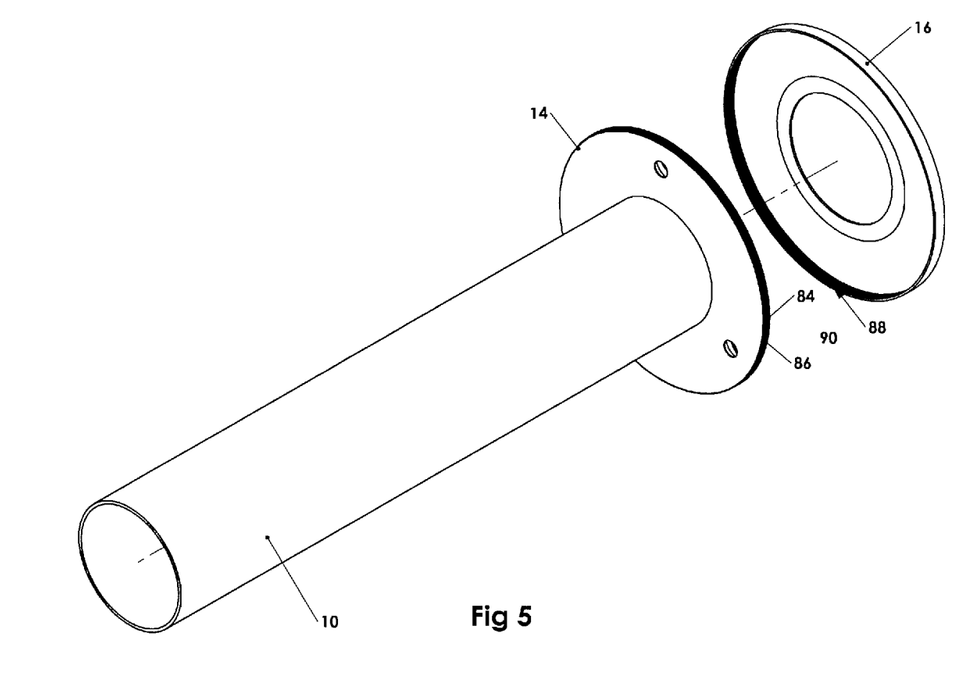
FIG. 5 is an alternate exploded view of a fishing rod holder with mounting bracket and a threaded protective cover.

Referring to FIG. 5, an embodiment of the instant invention is illustrated, wherein the outer circular side surface 84 contains threads 86. The protective cover 16 has a lower inner side surface 88 containing threads 90 which interconnect with the threads 86 of the outer circular side surface 84 of the mounting bracket 14 to secure the protective cover 16 to the mounting bracket 14.

Figure 6:
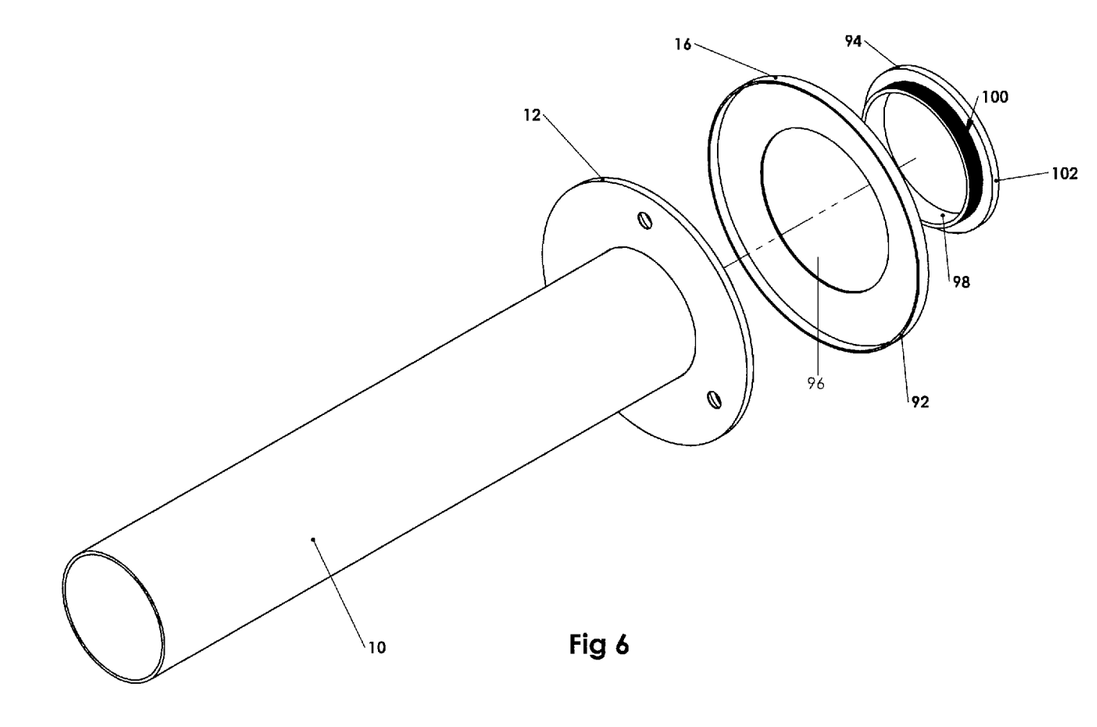
FIG. 6 is an alternate exploded view of a fishing rod holder with mounting bracket and a protective cover secured with a threaded ring.

FIG. 6 illustrates an embodiment of the instant invention wherein the protective cover 16 consists of two circular sections, the larger outer circular ring 92 and the smaller inner circular ring 94; the outer circular ring 92 having a circular opening 96 for receiving the inner circular ring 94. The inner circular ring 94 consists of a lower vertical ring portion 98 containing threads 100 on the outside of said lower vertical ring portion 98, and an upper horizontal ring portion 102. The inner ring 94 is insertable into the outer circular ring 92, and has threads 100 on the outer side of the vertical ring portion 98. The threads 100 are coupled with opposing threads on the inner circular surface (not shown) of the mounting bracket 14. The inner circular ring section 94 has a horizontal upper ring portion 102 which is slightly larger than the opening in the outer circular ring inner section 96 to prevent the inner circular ring 94 from complete insertion into the outer circular ring section 92.

Figure 7:
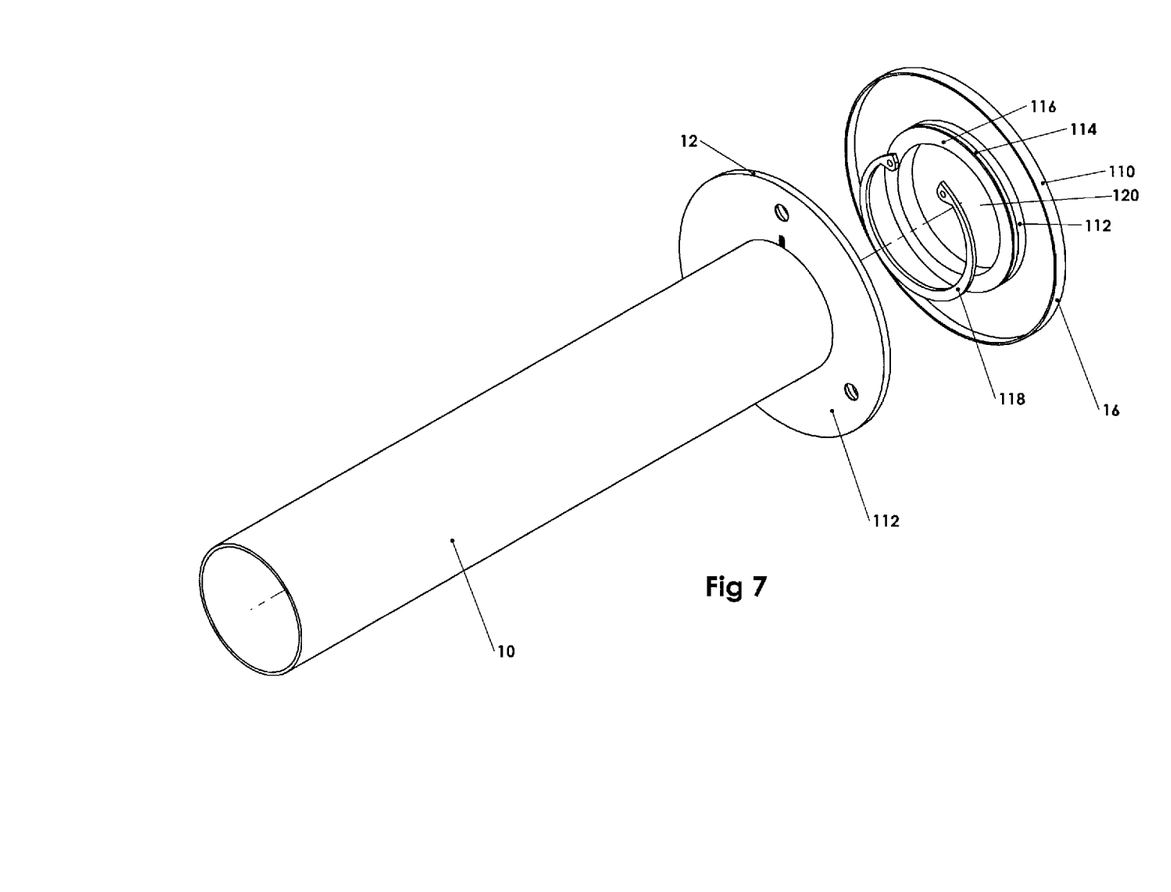
FIG. 7 is an alternate exploded view of a fishing rod holder with mounting bracket and a protective cover secured with a snap ring.

FIG. 7 illustrates an embodiment of the instant invention wherein the protective cover 16 having a larger outer circular ring 110 and a smaller inner circular ring 114. The smaller inner circular ring 114 having a groove 116 for receipt of a snap ring 118. The rod holder assembly 10, consisting of a circular cylindrical rod holder section 12, having a reciprocal groove 122 for receipt of the snap ring 118. The snap ring 118 being inserted into the inner ID 120 of the protective cover 16.

Figure 8:
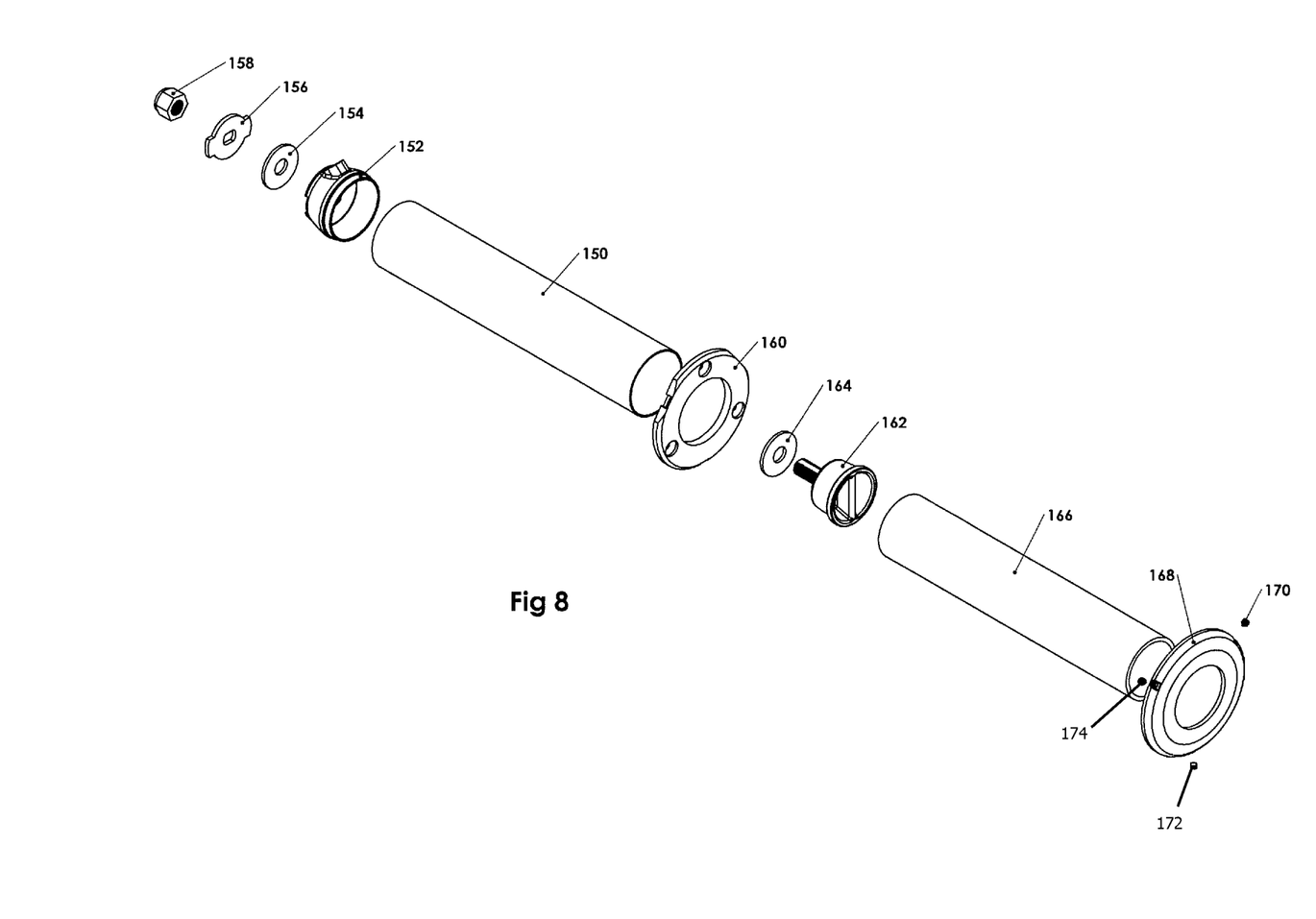
FIG. 8 is an exploded view depicting a rotational plug.

FIG. 8 depict an alternative end to the rod holder having a cylindrical tube 150 which is coupled to a fixed end plug 152. A rotational end is formed by an acetal washer 154 and a rotation lock washer 156 having a shaped aperture and a shaped outer edge. The rotational end includes a rotation plug 162 having a shaped threaded shaft that extends through a second acetal washer 164, through the fixed end 152 and a lock nut 158 is used to secure the rotational plug 162 to the fixed end. The rotation lock washer 156 is used to lock the rotational plug 162 by coupling with the notches in the fixed end 152. This feature allows for any rotating base rod holder to also be used as a fixed rod holder by using the notched lock washer 156. Removal of the lock washer 156 enables the rod holder to rotate again. By using or removing the lock washer 156, the rotation plug 162 can be converted between a fixed location or allow for rotation.

The rotational plug 162 having an upper portion cross piece that can be changed in a perpendicular direction allowing placement of a fishing rod in alternative positions. The rotational plug is constructed and arranged to receive a forked fishing rod butt. The shaped shaft along the lower portion of the rotational plug 162 is available for engaging the rotation lock washer 157 having engagement tabs that are operatively associated with the fixed end plug 152. Similar to the previous embodiments, the cover 168 is securable to the base 160, in this embodiment by use of the threaded fasteners 170, 172 and 174. The shaped shaft is preferably hollow to allow water to drain from said cylindrical tube 150, which may include a sleeve liner 166.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The use of the term "or" in the claims is used to mean "and/or" unless explicitly indicated to refer to alternatives only or the alternative are mutually exclusive, although the disclosure supports a definition that refers to only alternatives and "and/or."

What is claimed is:

1. A rod holder for securement to the gunwale of a vessel comprising:
   a mounting bracket having an upper surface and a lower surface with a centrally disposed aperture therethrough,
   a cylindrical tube depending from said lower surface and extending said aperture a distance therefrom, said shaped mounting bracket having three screw fastener receptacles positioned around said aperture;
   a threaded fastener screw constructed and arranged to fit into each said receptacle for securing said mounting bracket to the gunwale;
   a protective cover removably attached to said mounting bracket; and
   a fixed end plug secured to an end of said cylindrical tube for receipt of a rotational plug, said rotational plug having an upper portion constructed and arranged to receive a forked fishing rod butt and a lower portion having a shaped shaft for engaging a rotation lock washer having engagement tabs that are operatively associated with said fixed end plug, said shaped shaft is hollow to allow water to drain from said cylindrical tube;
   wherein said protective cover conceals said mounting bracket and said threaded fastener screws from view and said rotational plug can be rotated and secured into various positions.

2. The rod holder according to claim 1 wherein said mounting bracket has an outer diameter with at least two flat surfaces, and said protective cover has an inner surface with reciprocal flat surfaces securable to said mounting bracket.

3. The rod holder according to claim 2 including inset screws to couple said protective cover to said mounting bracket.

4. The rod holder according to claim 1 wherein said mounting bracket has an inner diameter with at least two locking tab flat receptacles, and said protective cover has an inner surface with at least two locking tabs, whereby said locking tabs engage said locking receptacles to secure said protective cover to said mounting flange.

5. The rod holder according to claim 1 wherein said mounting bracket has an inner diameter, and said protective cover has an inner surface with a lip extending into said inner diameter of said mounting bracket, wherein said protective cover is secured to said mounting bracket with at least one inset screw threaded through said lip to engage said mounting bracket inner diameter.

6. The rod holder according to claim 1 wherein said mounting bracket has a threaded outer diameter and said protective cover has a threaded inner surface, whereby said protectable cover is fastened to said mounting bracket by threaded securement.

7. The rod holder according to claim 1 wherein said mounting bracket has a threaded inner diameter, and said protective cover is positioned over said mounting bracket and secured thereto by the use of an inner ring having threaded constructed and arranged to engage said threaded inner diameter of said mounting flange.

8. The rod holder according to claim 1 wherein said mounting bracket has a grooved inner diameter, and said protective cover is positioned over said mounting bracket and secured thereto by the use of a snap ring constructed and arranged to engage said groove inner diameter.

9. The rod holder according to claim 1 including a fastener for securing said rotation plug to said end plug.

\* \* \* \* \*